United States Patent
Muthuswamy et al.

(10) Patent No.: US 8,811,344 B1
(45) Date of Patent: Aug. 19, 2014

(54) METHODS AND APPARATUS FOR ASSIGNING SAME SEQUENCE NUMBER TO MULTIPLE GTP MESSAGES

(75) Inventors: Sridharan Muthuswamy, Cupertino, CA (US); Logan L. Bauer, Campbell, CA (US); Santhosh Kumar Thodupunoori, San Jose, CA (US); Senthil Raja Velu, Sunnyvale, CA (US)

(73) Assignee: WiChorus, Inc., Naperville, IL (US)

( * ) Notice: Subject to any disclaimer, the term of this patent is extended or adjusted under 35 U.S.C. 154(b) by 394 days.

(21) Appl. No.: 13/355,002

(22) Filed: Jan. 20, 2012

(51) Int. Cl.
*H04W 40/00* (2009.01)
(52) U.S. Cl.
USPC .......................................... 370/331; 370/328
(58) Field of Classification Search
None
See application file for complete search history.

(56) References Cited

U.S. PATENT DOCUMENTS

| | | | |
|---|---|---|---|
| 7,339,925 B2* | 3/2008 | O'Neill et al. | 370/356 |
| 2009/0016334 A1* | 1/2009 | Forsberg et al. | 370/389 |
| 2009/0262683 A1* | 10/2009 | Khetawat et al. | 370/328 |
| 2009/0262684 A1* | 10/2009 | Khetawat et al. | 370/328 |
| 2012/0082089 A1* | 4/2012 | Nelakonda et al. | 370/328 |
| 2013/0265883 A1* | 10/2013 | Henry et al. | 370/241 |

* cited by examiner

*Primary Examiner* — Marcus R Smith
*Assistant Examiner* — Omeed D Rahgozar
(74) *Attorney, Agent, or Firm* — James M. Wu; JW Law Group

(57) ABSTRACT

A method and apparatus for assigning the same sequence number ("SN") to multiple messages using a global index pool and non-standard source ports ("NSPs") are disclosed. After generating a global index pool containing multiple indexes, the process, in one embodiment, generates a set of NSPs for a network device. Upon creating a first SN for a general packet radio service tunneling protocol ("GTP") message between peer-to-peer communications, the SN is stored in a first field of a first index. The process subsequently inserts a socket address used for indexing or addressing one of the NSPs in a second field of the first index.

13 Claims, 7 Drawing Sheets

METHODS AND APPARATUS FOR ASSIGNING SAME SEQUENCE NUMBER TO MULTIPLE GTP MESSAGES

FIELD

The exemplary embodiment(s) of the present invention relates to communications network. More specifically, the exemplary embodiment(s) of the present invention relates to network communications between network nodes or devices.

BACKGROUND

With rapid growth of mobile data transfer over a high-speed communication network such as 3G or 4G cellular services, authenticating, managing, and controlling such data transfer become increasingly difficult and complicated. A conventional network layout includes Internet, LAN (local area network), and wireless networks having hundreds of network devices such as access switches, routers, and bridges for facilitating data delivery from source devices to destination devices. Authenticating and transferring massive amount of data efficiently between wireless portable devices such as smart phones and/or laptops over a typical and/or standard network becomes increasingly challenging.

To manage traffic flows efficiently between sources and destinations, various types of IP (Internet Protocol) based communications protocols are used to facilitate communications between nodes, peers, and/or network devices. For example, conventional GPRS Tunneling Protocol ("GTP"), also known as GTP messages, is a type of IP based communication protocol capable providing general packet radio service ("GPRS") between devices or switches in a network such as 3rd Generation Partnership Project ("3GPP") and/or Long Term Evolution ("LTE"). In general, GTP can be categorized into several independent protocols such as GTP-C and GTP-U. GTP-U is used to transfer data within a GPRS core network. GTP-C is used to provide signaling or messages between network nodes such as Gateway GPRS Support Nodes ("GGSN"), Serving GPRS Support Nodes ("SGSN"), and/or mobility management entity ("MME").

To provide peer communication, conventional GTP messaging system typically consumes substantially amount of network resources such as memory space and sequence numbers to maintain and/or manage various versions of GTP, such as GTPv0, GTPv1, and GTPv2.

SUMMARY

A method and apparatus for assigning the same sequence number ("SN") to multiple messages using a global index pool and non-standard source ports ("NSPs") are disclosed. After generating a global index pool containing indexes, the process, in one embodiment, generates a set of NSPs for a network device. Upon creating a first SN for a general packet radio service tunneling protocol ("GTP") message for peer-to-peer communications, the SN is stored in a first field of a first index. The process subsequently inserts a socket address used for indexing or addressing one of the NSPs in a second field of the first index.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
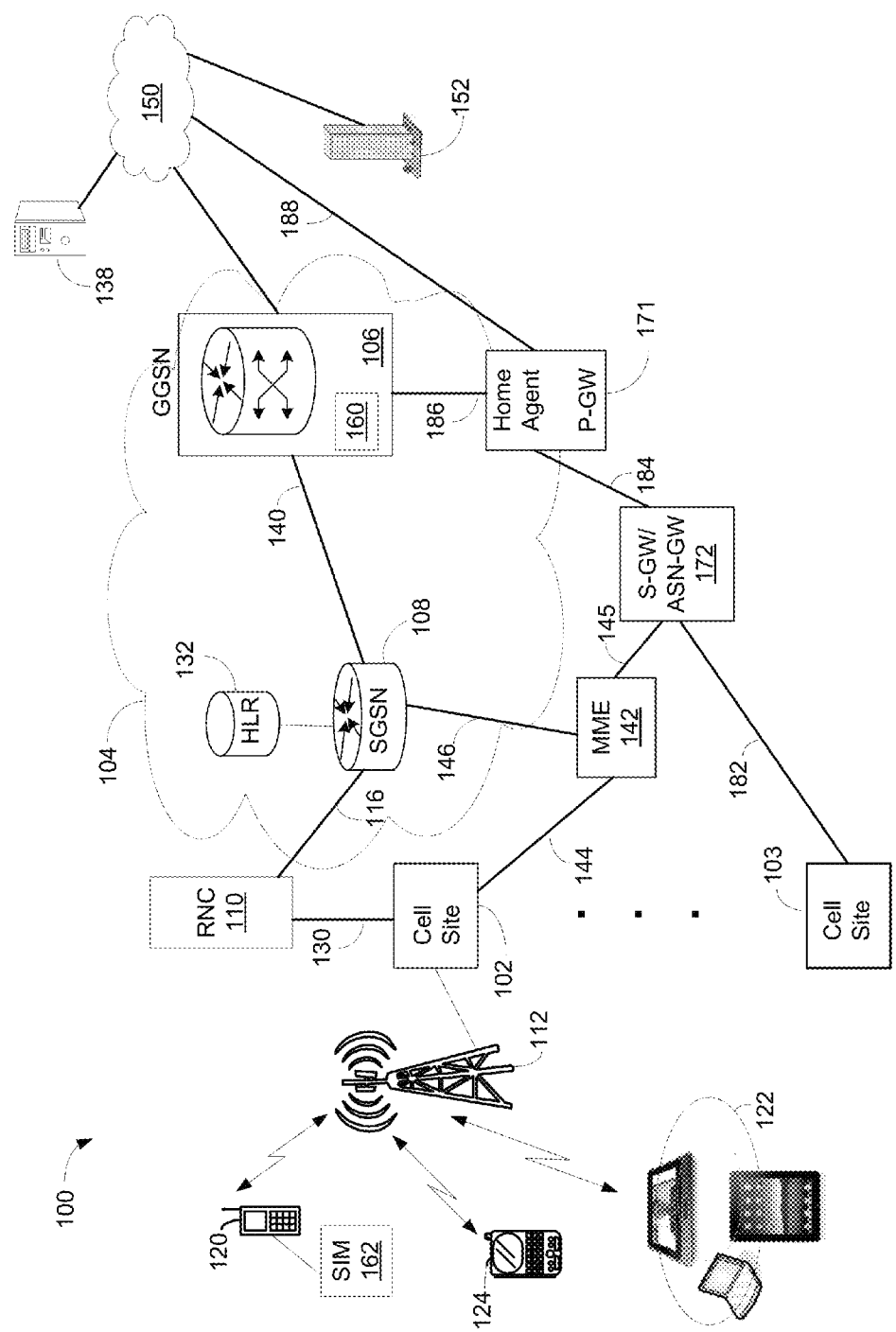
FIG. 1 is a block diagram illustrating a network configuration having one or more network devices able to assign the same SN to multiple GTP messages in accordance with one embodiment of the present invention.

Exemplary embodiment(s) of the present invention is described herein in the context of a method, device, and apparatus of assigning same sequence number to more than one GTP message using a global index pool.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Information pertaining to the transfer of packet(s) through a network is embedded within the packet itself. Each packet traveling through one or more communications networks such as Internet and/or Ethernet can be handled independently from other packets in a packet stream or traffic. For example, each router, which may include routing, switching, and/or bridging engines, processes incoming packets and determines where the packet(s) should be forwarded.

One embodiment of present invention discloses a mechanism of assigning the same sequence number ("SN") to more than one GTP (general packet radio service (GPRS) tunneling protocol) messages utilizing a global index pool as well as multiple non-standard source ports ("NSPs"). After generating a global index pool containing multiple indexes, the process, in one embodiment, generates a set of NSPs for a network device. The network device, in one example, is a line card. Upon generating a first SN for a GTP message used for peer-to-peer communications, the SN is stored in a first field of an index in the global index pool. An NSP address, also known as socket address, is subsequently inserted into a second field of the index for addressing the NSP.

FIG. 1 is a block diagram illustrating a network configuration having one or more network devices able to assign the same SN to multiple GTP messages in accordance with one embodiment of the present invention in accordance with one embodiment of the present invention. Diagram 100 illustrates cell sites 102-103, switching network 104, network nodes 106-108, mobility management entity ("MME") 142, radio network controller ("RNC") 110, serving gateway ("S-GW") 172, and packet data network gateway ("P-GW") or HomeAgent 171. Node 106 is also coupled to Internet, wide area network ("WAN"), or virtual private network ("VPN") 150. Internet, WAN, or VPN provides network communication between node 106 and network devices such as server 138 and service provider(s) or subscription partner 152. Subscription or service provider 152, in one aspect, can be a wireless carrier responsible for monitoring and managing user subscriptions. Server 138 may be a remote network server capable of providing network policy. It should be noted that the underlying concept of the exemplary embodiment(s) of the present invention would not change if one or more blocks (or devices) were added to or removed from diagram 100.

The network configuration illustrated in diagram 100 may also be referred to as a third generation ("3G"), fourth generation ("4G"), LTE (long term evolution), or combination of 3G and 4G cellular network configurations. MME 142, in one aspect, is coupled to cell site 102 and S-GW 172 via connections 144-145 and facilitates data transfer between 3G and LTE or between 2G and LTE (or 4G). In LTE (or 4G) network environment, MME 142 performs various controlling/managing functions, such as UE (user equipment) idle mode for tracking, paging, and retransmitting activities. MME 142 also provides network security management as well as resource allocations. To access packet based and/or IP based networks, MME 142, in one aspect, is able to reach other networks such as Ethernet and/or Internet via S-GW 172 and P-GW 171.

S-GW 172, in one example, is coupled to MME 142 and cell site 103 via connections 145 and 182, and is capable of routing data packets from cell site 103 (eNodeB) or MME 142 or P-GW 171 via connections 145 and 184. Note that S-GW 172 can couple to additional network elements such as additional MMEs and/or base stations. In an evolved packet core ("EPC") network environment, S-GW 172 can also be used to perform an anchoring function for mobility between 3G and 4G equipments. S-GW 172, in one aspect, performs various network management functions, such as authenticating device identity, terminating paths, paging idling UEs, storing data, routing information, generating replica, and the like.

P-GW 171, which is also known as HomeAgent, is coupled to S-GW 172, GGSN 106, and Internet 150 via connections 184-188, wherein P-GW 171 is able to provide network communication between an UE and IP based networks such as Internet 150. P-GW 171 is used for connectivity, packet filtering, inspection, data usage, billing, PCRF (policy and charging rules function) enforcement, et cetera. P-GW 171 also provides an anchoring function for mobility between 3G and 4G (or LTE) packet core network(s). Note that P-GW 171 could be merged into GGSN 106 as a single NE or node. Alternatively, P-GW 171 is able to directly route data between UEs via Internet 150.

Switching network 104 can be referred to as packet core network. Cell sites 102-103 may be referred to as radio access networks. It should be noted that a different network architecture or configuration may be implemented for 3G, 4G, or 5G cellular networks with different layout of network elements, and/or differently named network elements, but the underlying concept of exemplary embodiment would not change. Switching network 104, in one aspect, includes IP and/or Multi Protocol Label Switching ("MPLS") based network capable of operating at a layer of Open Systems Interconnection Basic Reference Model ("OSI model") for information transfer between clients and network servers. In one aspect, switching network 104, including nodes 106-108, a home location register ("HLR") 132, is able to route packet traffic between cell sites 102-103 and Internet 150. For example, node 108 transmits information between cell site 102 and HLR 132 via connections 116 and 130. Node 106 transmits information to (and receives information from) cell site 102 via connections 140, 116, and 130.

Node 106, in one aspect, is a gateway GPRS support node ("GGSN") wherein GPRS refers to general packet radio service. GGSN 106 may include one or more routers or switches capable of managing, monitoring, and routing network traffic or network flows between sources and destinations. Network flow or packet flow, in one example, is data traffic traveling through the network between source and destination. Network node or GGSN 106, hereinafter referred to as GGSN, can also be a router, Access Service Network Gateway ("ASN-GW"), Packet Data Network Gateway ("PDN-GW"), serving gateway, switch, hub, or a combination of router, Access Service Network Gateway, P-GW, S-GW, switch, and/or line card.

Node 108 is a serving GPRS support node ("SGSN") configured to authenticate portable wireless UEs, registering mobile devices, collecting network usage information for billing, et cetera. A function of SGSN 108 is to adjust quality of service by activating or deactivating users' sessions. While SGSN 108 tracks and/or controls mobile communication, GGSN 106 inspects and routes information and/or packet traffic between mobile terminal(s) and intended destination(s). Alternatively, SGSN 108 is connected to MME 142 which is also able to route packet streams to/from LTE network. Note that SGSN 108 can include MME functions. It should be noted that node 108 can be SGSN, MME, and/or a combination of SGSN and MME.

RNC 110 may be coupled to other network elements such as a second RNC or PCU (packet control unit), not shown in FIG. 1, to enhance network management and communication. Connections 116 and 140 are used to facilitate communication between RNC 110 and nodes 106-108. RNC 110, in one example, provides network management for controlling NEs in UMTS (universal mobile telecommunications system) radio access network ("UTRAN") and base stations that are connected to it.

Cell site 102, also known as base station, node B, or eNodeB, includes a radio tower 112. Radio tower 112 is further coupled to various UEs, such as a cellular phone 120, a handheld device 124, tablets and/or iPad® 122 via wireless communications. Handheld device 124 can be a smart phone, such as iPhone, BlackBerry®, Android®, and so on. In one aspect, handheld devices 120-124 store their IMSIs in their SIM cards such as SIM 162. Cell site 102 facilitates network communication between mobile devices such as handheld device 124 and iPad® 122 via radio tower 112. It should be noted that cell site 102 may include additional radio towers as well as other land switching circuitry.

Referring back to FIG. 1, GGSN 106, in one embodiment, includes a SN assigner ("SNA") 160 configured to assign the same SN to multiple messages or GTP messages through different non-standard ports ("NSPs"). SNA 160, in one aspect, includes a set of predefined NSPs and a global index pool. An NSP may be considered a logic port, virtual port, and/or socket capable of transmitting a request (REQ) message to a peer and subsequently receiving a response (RSP) message from the peer. The global index pool, in one embodiment, includes many indexes wherein each index contains an SN field and a NSP field. While the SN field is used to store an SN, the NSP field is used to store a socket number or socket address used to indicate a specific NSP.

In a high performance network environment, each line card in a slot of a gateway such as LTE/GGSN gateway can serve up to one (1) million mobile subscribers and handles large number of messages such as 4,000 GTP-C messages per second. In 3G or 4G network environment for example, a chassis of a gateway is able to house up to 14 line cards ("LCs") in its 14 slots. The network link to peers such as SGSN or MME can be congested because locally generated messages and/or procedures are required to be held until the procedures complete. A procedure may need to be held for $T3*(2^{N3-1})$ seconds, where N3 is the number of retry attempts, T3 is the minimum waiting time in seconds before the first retry and subsequent retries. For the purpose of consistency and reliability, a sequence number assigned to a GTP message may be held (or not reassigned) until the procedure is completed. With larger number of messages, large number of sequence numbers is required.

SNA 160, in one embodiment, provides an efficient mechanism for handling sequence number assignments which can be potentially support between 500,000 and 3,000,000 simultaneous outstanding procedures per slot and per network in a high capacity system. One advantage of using SNA 160 is to provide a global index pool which SNs are derived from various GTP versions such as GTPv2/GTPv1/GTPv0 without significant memory increase. Another advantage of using SNA 160 is to balance multi-slot load distribution using UDP source port assignment. SNA 160 manages sequence number assignment as well as load distribution of locally initiated GTP-C messages in a multi-slot LTE/GGSN gateway.

Figure 2:
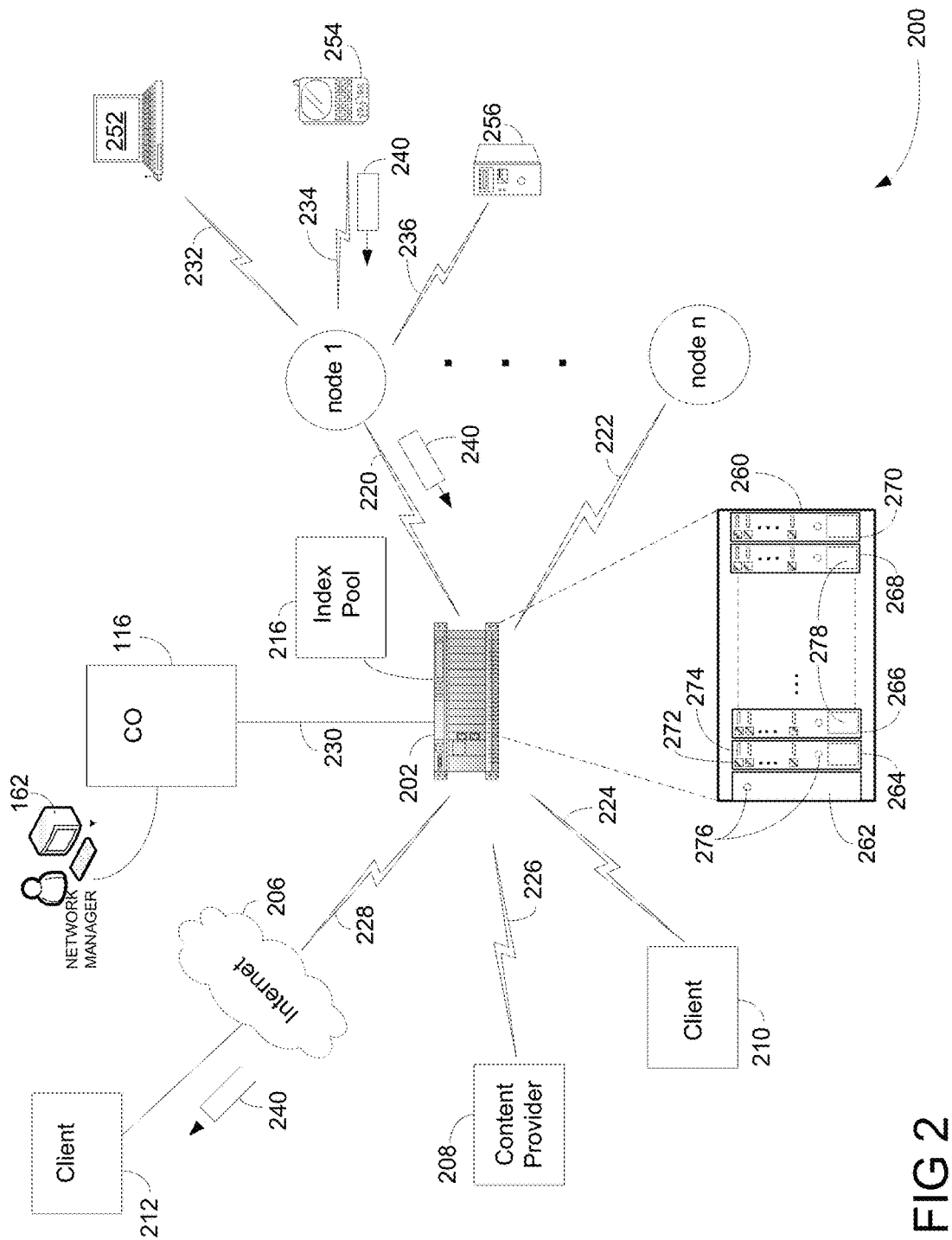
FIG. 2 is a block diagram illustrating an exemplary network system containing multiple line cards capable of assigning same SN to multiple messages in accordance with one embodiment of the present invention.

FIG. 2 is a block diagram 200 illustrating an exemplary network system containing multiple line cards capable of assigning same SN to multiple messages in accordance with one embodiment of the present invention. Diagram 200 includes a network system ("NS") 202, CO 116, content provider 208, clients or end user 210-212, and various network nodes. Network nodes, also known as nodes, include node 1 through node n wherein n can be any integer number. In a communications network, a physical network node or node can be an NE or a cluster of network devices, such as a router, modem, hub, bridge, switch, handset, computer, server, workstation, et cetera. Node 1, for example, can be a network entity capable of coupling to host 252, portable device 254, and server 256 via connections 232-236. It should be noted that the underlying concept of the exemplary embodiment(s) of the present invention would not change if one or more blocks (or devices) were added to or removed from diagram 200.

NS 202, which can be a node, router, or switch, is configured to direct or route packet flows between nodes and/or clients 210-212. A network manager or administrator 162 is able to communicate with NS 202 via CO 116. In one aspect, CO 116 is coupled to NS 202 via connection 230. Alternatively, CO 116 can be configured to reside within NS 202. NS (or router) 202 can also be configured to provide routing services to remote clients such as client 212 via Internet 206. Connections 220-228, which can be wired, wireless, or a combination of wired and wireless connections, are employed to connect NS 202 to clients 210-212, content provider 208, and nodes. Note that client(s) can be servers, routers, switches, computers, user's equipments, mobiles, network equipments, network elements, websites, and so forth.

NS 202, in one embodiment, includes a rack or chassis 260 containing a network processing card 262 (or control plane) and multiple line cards ("LCs") 264-270. Network processing card 262 including a power-on indicator 276 is configured to distribute incoming traffic to one of LCs 264-270 for packet processing and routing. Each of LCs 264-270, which contains multiple port connectors 272 and status indicators 274, is able to route packet flows to their destinations via one or multiple networks. LCs 264-270, in one example, includes GGSN and SGSNs capable of generating locally initiated messages for peer communications.

NS 202, in one example, includes 14 slots capable of receiving or housing 14 LCs, wherein LCs may include GGSN, SGSNs, MME, and the like. To facilitate communications between LCs within NS 202, the GTP messaging system, for example, is used. Each LC, in one aspect, includes an SNA which further includes a global index pool 216. After establishing a predefined number of NSPs, the SNA is able to assign the same SN to different GTP messages sent from different NSPs. In one embodiment, NS 202, which is a high performance and high capacity multi-slots LTE/GGSN gateway, uses global index pool 216 to efficiently assign SNs for locally generated GTP-C messages.

An advantage of using a global index pool is to eliminate or reduce separate index pool for each GTP version as well as for each peer, whereby memory conservation is achieved. Also, congestion in network links to peers can reduce because the global index pool can provide up to half a million outstanding simultaneous procedures per slot and per network. It should be noted that the global index pool 216 is extendable to buffer more than a half million procedures. Another advantage of using the global index pool is to provide a uniform way of load distribution for all locally generated messages across all GTP protocol versions in the fast path.

Figure 3A:
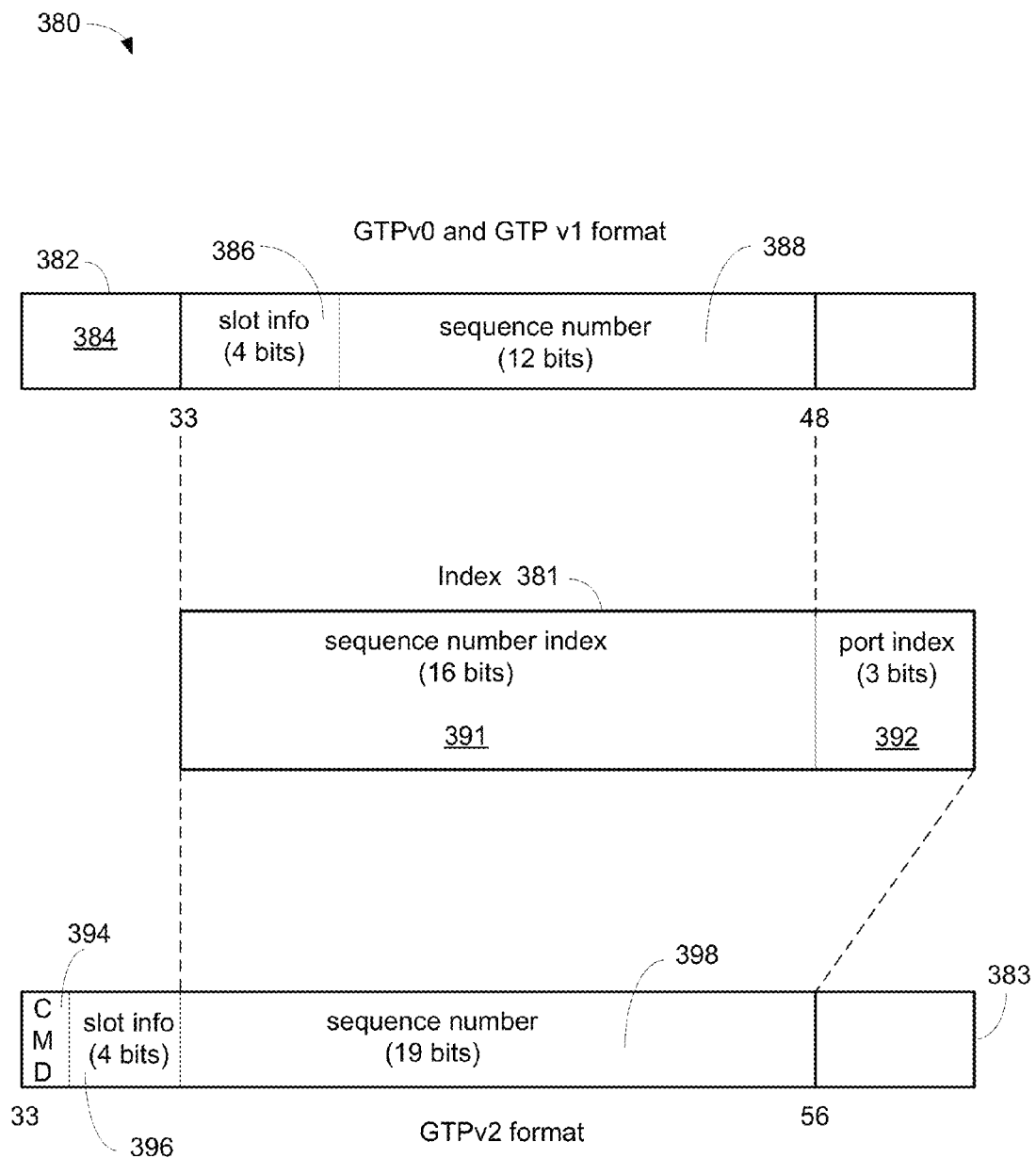
FIG. 3A is a block diagram illustrating an exemplary process of providing a 19-bit SN index capable of mapping SN to SN field of a GTP message in accordance with one embodiment of the present invention.

FIG. 3A is a block diagram 380 illustrating an exemplary process of providing a 19-bit SN index capable of mapping SN to SN field of a GTP message in accordance with one embodiment of the present invention. Diagram 300 includes an index 381, a GTPv0 or GTPv1 message 382, and a GTPv2 message 383. Index 381, in one example, can be fetched from or stored to a global index pool. It should be noted that the underlying concept of the exemplary embodiment(s) of the present invention would not change if one or more blocks were added to or removed from diagram 380.

Index 381 includes an SN field 391 and a port index 392. In one example, SN field 391 of index 381 is a 16-bit field and port index 392 is a 3-bit field. A global index pool containing 19-bit indexes can have up to 524,288 ($2^{19}$) different SNs. In one embodiment, 16-bit SN is used for all GTPv0, GTPv1, and GTPv2, and 3-bit port index, also known as socket index or socket address, is used to reference one of the eight source ports such as non-standard UDP source ports. The non-standard UDP source ports are assigned in a sequence of round robin whereby an evenly distributed load balance can be achieved. It should be noted that index 381 may include additional information, such as control bits and/or flags, but they are not important to illustrate the underlying concept of embodiment of the present invention.

GTPv0 or GTPv1 message 382 contains a header and a payload (not shown in FIG. 3A), wherein the header includes a 16-bit SN between bit positions 33 and 48. In one example, the upper 4 bits as indicated by numeral 386 are used to indicate slot information and the lower 12 bits as indicated by numeral 388 are used for SN. In one embodiment, the upper 16 bits 391 of index 381 are mapped into the 16 bits as indicated by numeral 386-388 as an SN for GTP message(s).

GTPv2 message 383 includes a header and a payload (not shown in FIG. 3A) wherein the header includes a 24-bit SN between bit positions 33 and 56. The 24-bit SN of message as indicated by numeral 383 includes 1-bit command bit as indicated by numeral 394, 4-bit slot information as indicated by numeral 396, and 19-bit SN 398. In one embodiment, the entire 19 bits of index 381 are mapped into 19-bit SN 398 of GTPv2 message 383 as an SN for GTP message(s).

To reduce memory usage and improve efficiency of SN assignment, indexes in the global index pool, in one embodiment, are configured in compliance with several different GTP versions. For example, a typical GTPv0 or GTPv1 message 382 contains 16 bits of SN wherein the first four (4) bits as indicated by numeral 386 are used to indicate the slot information and the next 12 bits as indicated by numeral 388 are used for SN. Also, a GTPv2 message 383 contains 24 bits of SN wherein a portion of the 24-bit such as the first 4 bits as indicated by numeral 396 is used to address slot(s) while the next 19 bits are used for SN. To generate an SN that is capable of being used for GTPv0, GTPv1, and GTPv2, index 381, in one embodiment, is configured to have a 19 bits field wherein the first 16 bits as indicated by numeral 391 are used for SN while the last three (3) bits as indicated by numeral 392 are used for port index.

SN, which is encapsulated in header of a message, in a request ("REQ") message is generally copied over in a response (RSP) message wherein the SN serves as procedure synchronization for the requester. Under standard GTP, such as 3GPP specification (TS 29.060 and TS 29.274), a SN is required to be present in GTP-C messages from the control plane. Note that GTPv2 has 24 bits SN and GTPv1/GTPv0 has 16 bits SN. For a multi-slot (up to 14 slots) LTE gateway, the gateway, for example, can handle approximately 500,000 outstanding simultaneous procedures per slot. To support such operation with GTPv2, a 19 bits global index pool 381 is used from which a 24 bits SN is derived wherein the lower 19 bits as indicated by numeral 398 of the SN is used for the index. One (1) bit of CMD as indicated by numeral 394 may be used for REQ/RSP message differentiation. Four (4) bits as indicated by numeral 396 are used for slot information. It should be noted that for RSP messages with TEID (tunneling endpoint identifier) equals to zero, the upper 4 bits as indicated by numeral 396 are used to distribute the message to the right slot or load distribution in the slow path. Note that the index pool is global because per peer SN needs substantial memory requirements when number of peers in the field can be in an order of thousands.

GTPv1 or GTPv0 has 16 bits SN. To derive the 16 bits SN from the global index pool, the upper 16 bits of the 19 bits index for GTPv1/GTPv0 can be directly used as the SN. To increase the volume of SNs, additional NSPs are created whereby the same SN may be assigned to multiple messages as long as the messages are sent by different NSPs.

According to standard GTP specification such as 3GPP TS 29.060 specification, the standard mandates that the SN shall be unique for each outstanding REQ message sourced from the same IP/UDP endpoint for reliable delivery of signaling messages. For example, when load is balanced at UDP source port, 4 bits of slot information can be freed up and the entire 16 bits SN can be used to support approximately 65,000 simultaneous outstanding procedures per slot. To further expand the volume of SNs, a predefined set of UDP NSPs are created together with global index pool to efficiently manage SN assignment through port based load distribution via multiple UDP end points.

It should be noted that diagram 380 illustrates an exemplary process with 19-bit index. Depending on the applications, additional bits can be added to index 381 or removed from index 381.

Figure 3B:
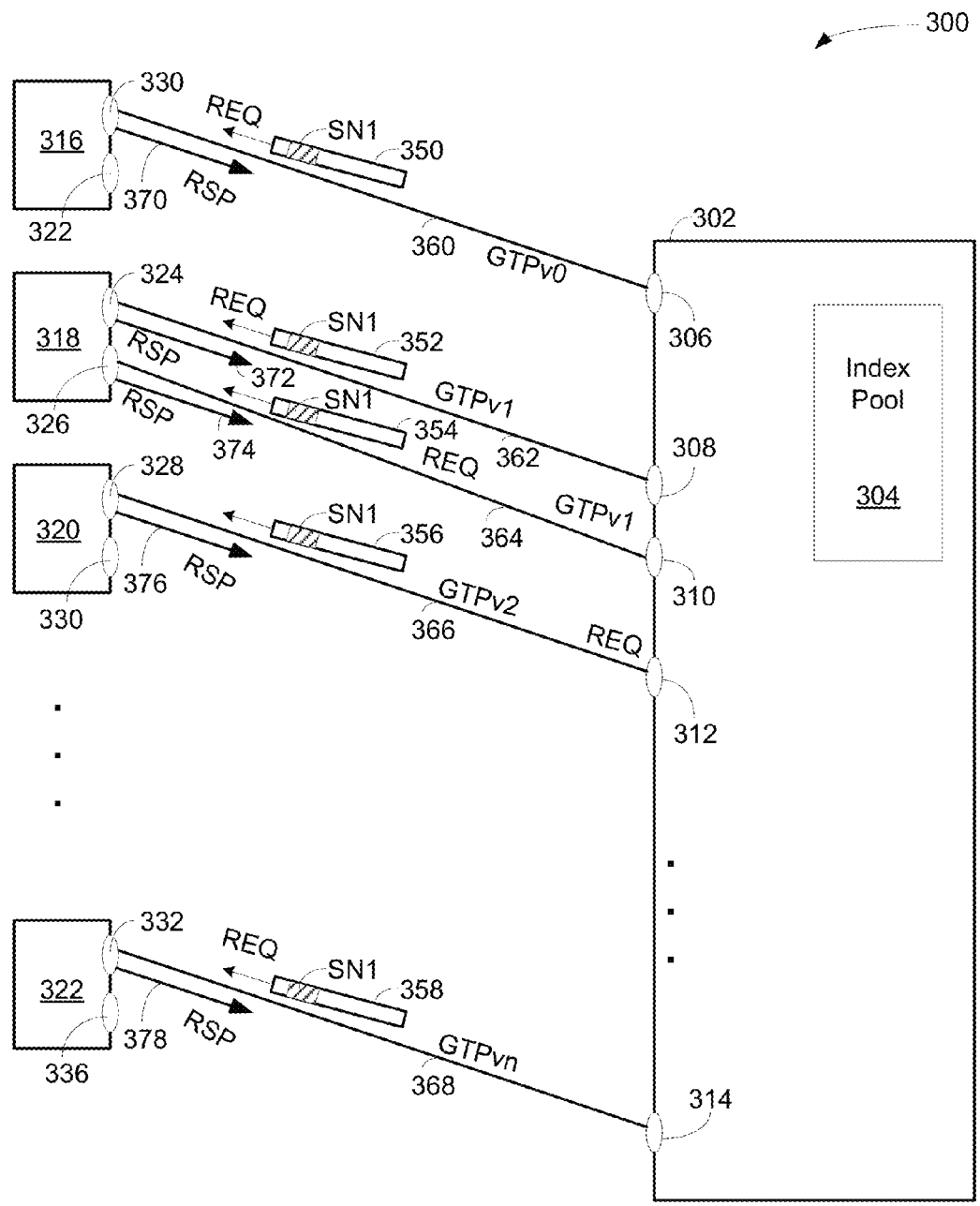
FIG. 3B is a logic block diagram illustrating a network device able to assign the same SN to multiple GTP messages via multiple NSPs in accordance with one embodiment of the present invention.

FIG. 3B is a logic block diagram 300 illustrating a network device able to assign the same SN to multiple GTP messages via multiple NSPs in accordance with one embodiment of the present invention. Diagram 300 includes a network device 302, peer devices or peers 316-322, and network links 350-368. Note that peers 316-322 can also be network devices, nodes, switches, LCs, or combination of devices, nodes, switches, and LCs. It should be noted that the underlying concept of the exemplary embodiment(s) of the present invention would not change if one or more blocks (or devices) were added to or removed from diagram 300.

Network device 302, in one embodiment, includes an index pool 304 and multiple NSPs 306-314. NSPs 306-314, in one example, are non-standard UDP source ports capable of initiating and receiving locally generated messages. Depending on the applications, NSP 306-314 can be configured to have 2, 4, 8, 16, 32, or 64 ports. NSPs 306-314 including embedded slot information are able to initiate locally created GTP-C message(s) for peer-to-peer communication. Index pool 304, also referred to as global index pool, is configured to include multiple indexes, wherein each index includes a SN field and an NSP field. The SN field is used to store an SN and the NSP field is used to store an NSP index or socket number indicating a specific NSP.

Network device 302 can be a router, switch, hub, LC, et cetera, and is capable of performing various networking related functions including GGSN functions. Network device 302 may include additional circuits and components performing other networking functions, but they are not important to understand the underlying concept of the embodiment of the present invention.

Peers 316-322 including various ports 330-336 are capable of performing various networking related functions such as SGSN, MME, and the like. Each peer such as peer 316 is configured to include one or more ports such as ports 330-322 capable of receiving and transmitting GTP messages. It should be noted that different peers such as SGSN, SGW, or MME may employ different versions of GTP for peer communication. For example, if device 302 is a GGSN and peer 316 is an SGSN, device 302 may employ GTPv0 or GTPv1 to signal or communicate with peer 316. Alternatively, if device 302 is an S-GW and peer 320 is an MME, device 302 will employ GTPv2 to communicate with peer 320.

Network links 360-368 may be physical connections, logic connections, virtual sessions, et cetera, and are configured to facilitate transferring GTP messages 350-358. Since the SN in the REQ message is copied to the RSP message for synchronizing procedures, network link(s) transmits a REQ message(s) from an NSP and subsequently forwards a RSP message to the NSP in accordance with the GTP operations.

For example, network device 302 as a GGSN composes and sends a GTPv0 REQ message 350 with sequence number one (1) ("SN1") to peer 316 as an SGSN via NSP 306 over network link 360. After receipt of REQ message 350, SGSN 316 extracts SN1 from REQ message 350 and inserts SN1 into a GTPv0 RSP message 370. RSP message 370 is subsequently sent to NSP 306 over network link 360 to complete the procedure. It should be noted that destinations or peers or endpoints can be the same device or peer as long as the messages are sent by different NSPs.

For instance, GGSN 302 composes and sends GTPv1 REQ messages 352-354 with SN1 to SGSN 318 via NSPs 308-310 over network link 362. After receipt of REQ messages 352-354, SGSN 318 extracts SN1 from REQ messages 352-354 and inserts SN1 into GTPv1 RSP messages 372-374. RSP message 372 is subsequently sent to NSP 308 over network link 362, while RSP message 374 is sent to NSP 310 over network link 364 to complete the procedures.

Alternatively, S-GW 302 composes and sends a GTPv2 REQ message 356 with SN1 to peer 320 as an MME via NSP 312 over network link 366. After receipt of REQ message 356, MME 320 extracts SN1 from REQ message 356 and inserts SN1 into a GTPv2 RSP message 376. RSP message 376 is subsequently sent to NSP 312 over network link 366 to complete the procedure. It should be noted that SN1 or the same SN is used for GTP messages 350-358 for the peers' communication via different NSPs.

An advantage of employing SNA using NSPs with global index pool is to increase number of SNs while in compliance with the existing GTP interface standards.

Figure 4:
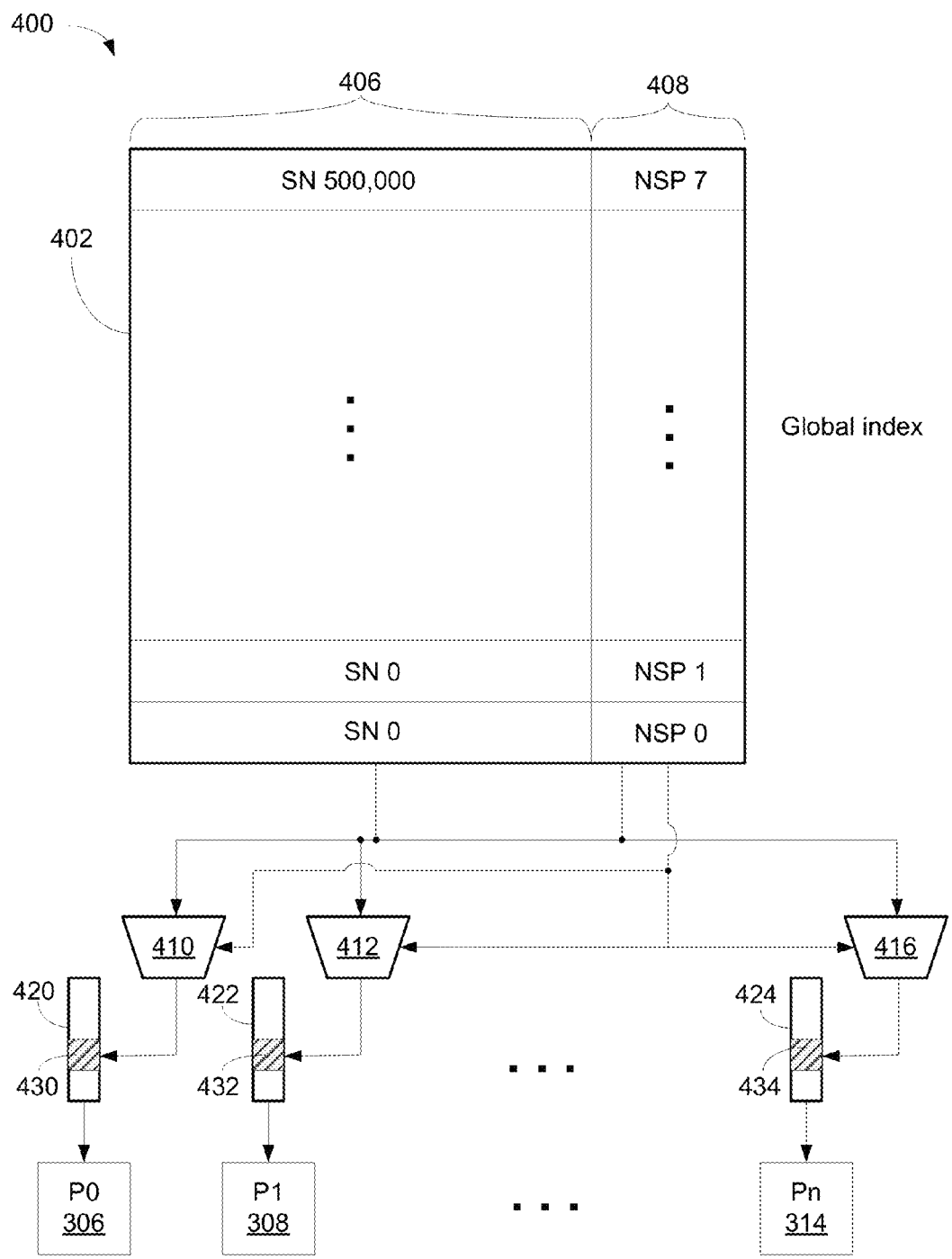
FIG. 4 is a block logic diagram illustrating a logic process of assigning SN to messages using a global index pool in accordance with one embodiment of the present invention.

FIG. 4 is a block logic diagram 400 illustrating a logic process of assigning SN to messages using a global index pool in accordance with one embodiment of the present invention. Diagram 400 includes a global index pool 402, NSPs 306-314, and GTP messages 420-424. GTP messages 420-424 includes SN 430-434 wherein SN 430-434 may be the same SN or some of them are the same SN. It should be noted that the underlying concept of the exemplary embodiment(s) of the present invention would not change if one or more blocks (or devices) were added to or removed from diagram 400.

Global index pool 402 includes multiple indexes wherein each index contains an SN field 406 and an NSP field 408. SN fields 406 are configured to store SNs, and NSP fields 408 are configured to store NSP indexes. The NSP indexes can also be referred to as socket numbers, socket addresses, and NSP addresses. Depending on the applications, the size of index can vary between 16 bits and 64 bits. Similarly, the number bits for SN and NSP can also vary depending on the applications. In one embodiment, index size is 19 bits wherein the most significant 16 bits are used for SN and the least significant 3 bits are used to index NSPs. It should be noted that the order of SN fields 406 and NSP field 408 can change depending on the applications.

For an exemplary operation with 19-bit index, consecutive eight (8) SNs such as SN0 in global index pool are the same SN and the consecutive eight (8) NSPs are different NSPs. For example, for index entries from 0 to 7, SNs are all zero (0) and NSPs are ranged from zero (0) to seven (7) (i.e., 0, 1, 2, 3, 4, 5, 6, and 7). The same SN such as SN0, for example, is assigned to different messages 420-424 which will be sent by different NSPs 306-314. In one embodiment, distribution of the same SN to messages 420-424 is controlled by the NSP index 408 as shown by multiplexers 410-416. Once messages 420-424 are composed including SN 430-434, they are sent to their endpoints via NSP P0-P7.

It should be noted that global index pool can be expanded or adjusted depending on the applications and/or networking protocols.

Figure 5:
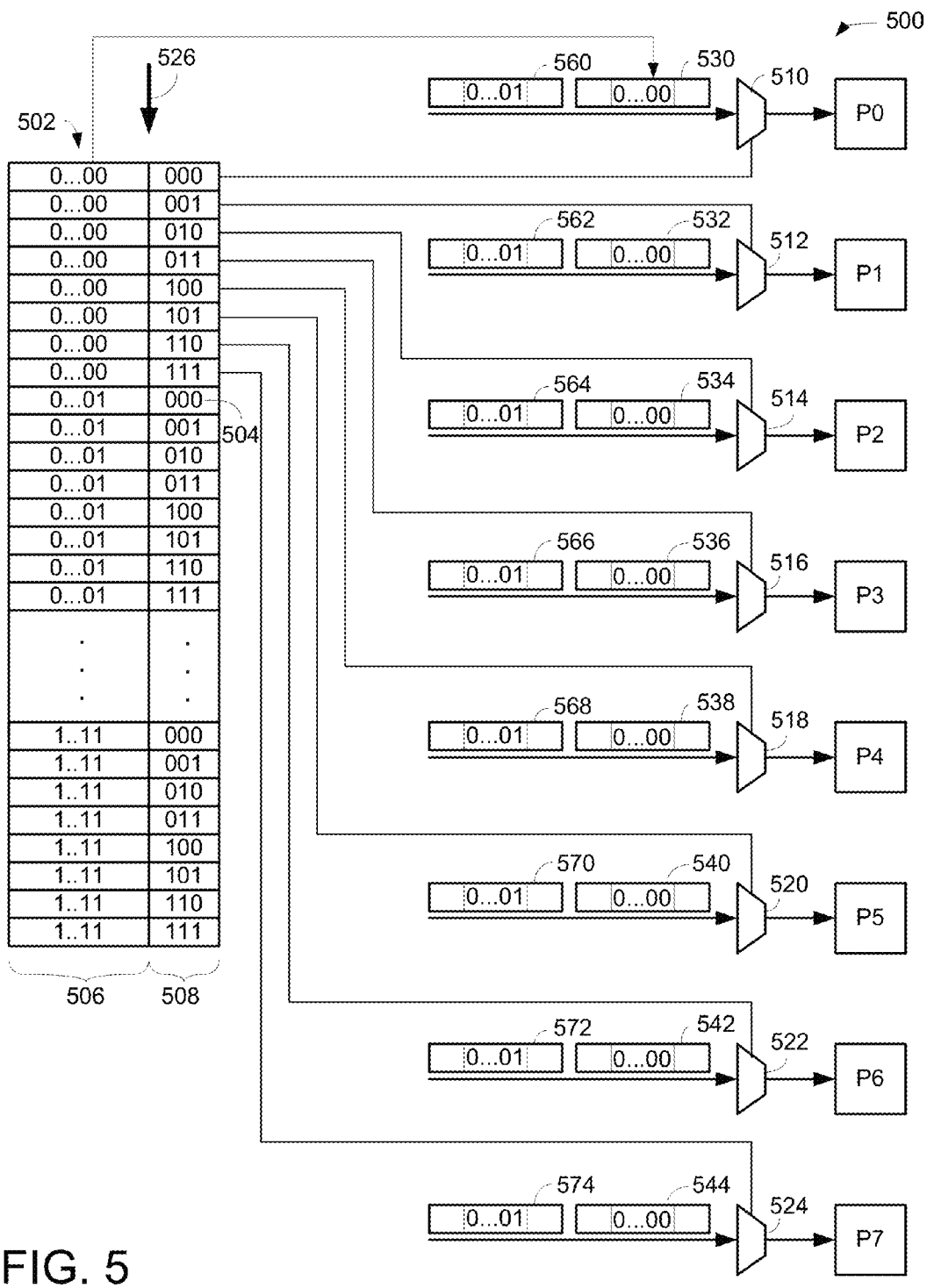
FIG. 5 is a block diagram illustrating an exemplary process of assigning same SN to multiple GTP messages for peer communication in a packet routing application in accordance with one embodiment of the present invention.

FIG. 5 is a block diagram 500 illustrating an exemplary process of assigning the same SN to multiple GTP messages for peer communication in accordance with one embodiment of the present invention. Diagram 500 includes a global index pool 502, eight (8) NSPs P0-P7, and 16 GTPv0 or GTPv 1 messages 530-574. Global index pool 502 includes SN indexes and NSP indexes wherein NSP indexes are ordered in a sequence of consecutive round robin order. The 3-bit sequence of consecutive round robin order can be defined as 0, 1, 2, 3, 4, 5, 6, 7, 0, 1, 2, 3, and so on. In one embodiment, NSP indexes 508 are used to evenly distribute load or GTP messages to NSPs P0-P7 using multiplexer 510-524.

During an operation, when NSP index is "000" in global index pool 508, it activates multiplexer 510 and NSP P0 is selected. The value "0 . . . 00" in global index pool 506 is subsequently loaded into GTP message 530 as the SN. Note that if the SN index is a 16-bit index, the value "0 . . . 00" indicates 16 zeros (0 s). Similarly, NSP indexes are used to select one of NSPs P1 through P7. The values "0 . . . 00" in global index pool 506 are used as SNs for GTP messages 530-544. It should be noted that GTP messages 530-544 have the same SN and they will be sent by different NSPs. When SN assignment in global index pool 502 moves down as indicated by numeral 526 and the assignment pointer (not shown in FIG. 5) reaches at a location where NSP equals to 0 as indicated by numeral 504, the value of SN in global index pool 502 increases from "0. . . 00" to "0 . . . 01". The next eight (8) SN are going to be the same SN as "0 . . . 01". For example, SNs for GTP messages 560-574 are the same SN with a value of "0 . . . 01" as shown in FIG. 5.

The exemplary embodiment of the present invention provides a process of using eight (8) non-standard UDP source ports to open 8 sockets on a gateway IP. The source ports are designed in such a way that they have the slot information embedded in them. For GTPv1/GTPv0, from the 19 bits of global index pool 502, the upper 16 bits are used for SN and the lower 3 bits are used to map the eight (8) UDP source ports. Note that locally generated messages are configured to use the eight (8) UDP source ports in a cyclic fashion whereby the GTPv1/GTPv0 messages can use the same SN across eight (8) IP/UDP end points (to the same peer or different peers) without conflict.

If a 19-bit index is used in global index pool 502, approximately 500,000 ($2^{16} \times 2^3$)) simultaneous outstanding procedures of GTPv0/GTPv1 messages per slot can be achieved. For GTPv0, the header, for example, has a 16 bits flow label field. The flow label in a REQ message is subsequently copied on to the RSP message. Note that three (3) bits of the flow label will be used for embedding UDP source port index and 4 bits for the slot information. Load distribution, however, is in the fast path and the flow label information may be optionally used to indicate slot or UDP port validation in the slow path.

For GTPv2, 4 bits of the 24 bits SN is used for slot information. Note that load distribution is in the slow path. Any slow path processing for slot information may be disabled since load distribution has been moved to the fast path. It should be noted that embedding the slot information in SN, however, may be continued in case the slow path validation may be optionally enabled at any future time. Note that upon system reboot or failover, the same UDP source port may be reserved for such additional sockets.

Locally generated echo messages reserve the SN for peer communications. When locally generated procedure(s) by echo message(s) are completed, SN returns to the global index pool for reassignment. It should be noted that the disclosed embodiment of SNA can be extended to buffering higher number of procedures. For example, slot information in SN for GTPv2 may be freed up for higher index pool size since the load distribution can be handled by UDP source port based in the fast path.

The exemplary aspect of the present invention includes various processing steps, which will be described below. The steps of the aspect may be embodied in machine, router, or computer executable instructions. The instructions can be used to create a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
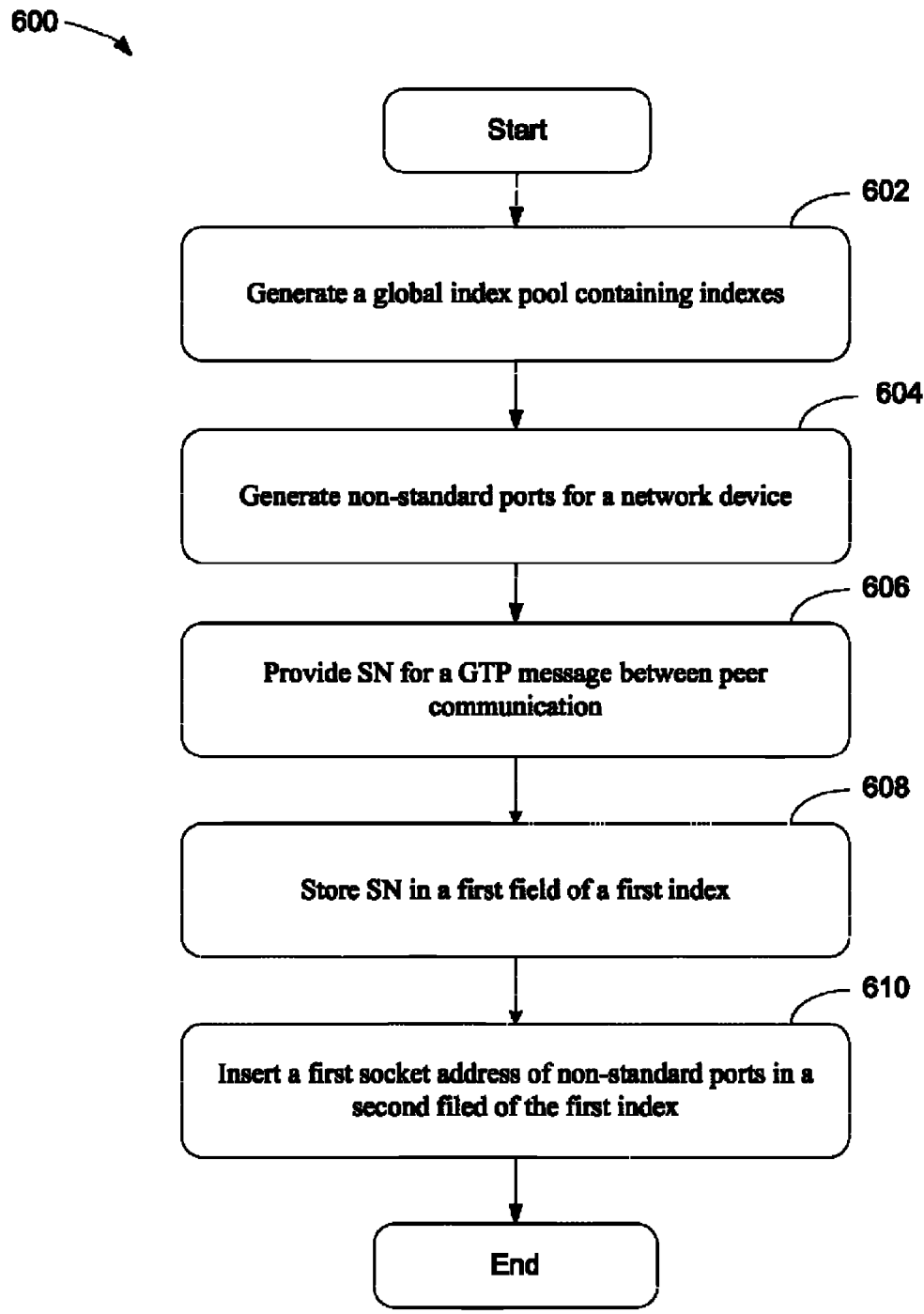
FIG. 6 is a flowchart illustrating an exemplary process of assigning the same SN to GTP messages in accordance with one embodiment of the present invention.

FIG. 6 is a flowchart 600 illustrating an exemplary process of assigning the same sequence number to GTP messages in accordance with one embodiment of the present invention. At block 602, a process of assigning SN is able to generate a global index pool containing indexes. The size of index may vary depending on the applications. In one example, the global index pool contains up to 500,000 indexes wherein each index is 19 bits wide.

At block 604, the process is capable of generating multiple NSPs for the network device or a gateway. NSPs are non-standard UDP source ports capable of sending and receiving GTP messages for networking communication. In one embodiment, the network device or gateway is GGSN configured to have eight (8) NSPs.

At block 606, the process generates a first SN, which can be used later for a GTP message for peer communications. For example, a 16-bit SN for the GTP message between the GGSN and the SGSN is created and/or generated. Alternatively, entire 19 bits of index may be used for a GTPv2 message.

At block 608, the first SN is stored in a first field of a first index in the global index pool. For a 19-bit index, a 16-bit SN is inserted in the upper portion of a 19-bit index and a 3-bit first socket address or NSP index is inserted in the lower portion of the 19-bit index. After storing the second SN in a first field of a second index, a second socket address of the NSPs is inserted in the second field of the second index.

At block 610, a first socket address of the NSPs is inserted in a second field of the first index. In one embodiment, after receiving a request of new SN, the process fetches an index from a global index pool. After determining a SN by extracting the value from a SN field of the index, a socket or NSP address is obtained from the second field of index. Upon assigning an SN to a GTP message for a peer-to-peer communication, an NSP is identified in accordance with the socket address for sending the GTP message(s).

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for providing sequence numbers, comprising:
   generating a global index pool containing a plurality of indexes, wherein generating a global index pool further includes configuring each index to a 19-bit wide index in the global index pool and providing the global index pool containing equal to or greater than 500,000 indexes;
   generating a plurality of non-standard ports for a network device, wherein generating a plurality of non-standard ports includes providing eight (8) non-standard ports for a gateway GPRS support node ("GGSN");
   providing a first sequence number ("SN") for a general packet radio service tunneling protocol ("GTP") message which is used for communication between peers, wherein providing a first SN further includes providing a 16-bit SN for the GTP message which can be sent from the GGSN to a serving GPRS support node ("SGSN");

storing the first SN in a first field of a first index of the plurality of indexes, wherein storing the first SN includes inserting a 16-bit SN in upper portion of a 19-bit index and a 3-bit first socket address in lower portion of the 19-bit index; and inserting a first socket address of the plurality of non-standard ports in a second field of the first index of the plurality of indexes.

2. The method of claim 1, further comprising:

fetching an index from a global index pool upon a request of new SN; and obtaining a SN from a SN field of the index.

3. The method of claim 2, further comprising:

assigning the SN to a GTP message for a peer communication; and identifying a non-standard port in response to a socket address obtained from the second field of the index.

4. The method of claim 3, further comprising sending the GTP message from the GGSN to SGSN.

5. The method of claim 2, further comprising:

providing a second SN;

storing the second SN in a first field of a second index of the plurality of indexes; and inserting a second socket address of the plurality of non-standard ports in the second field of the second index of the plurality of indexes.

6. A method for assigning a sequence number, comprising:

fetching an index from a global index pool, wherein fetching an index includes obtaining a 19-bit index from a global index pool containing at least 500,000 indexes;

obtaining a sequence number ("SN") from a SN field of the index, wherein obtaining a SN includes extracting a 16-bit SN from a 19-bit field of the index;

assigning the SN to a general packet radio service tunneling protocol ("GTP") message for peer communication;

identifying a non-standard port in accordance with a value in a socket field of the index, wherein identifying a non-standard port includes determining a non-standard port in the GGSN in response to a non-standard port index fetched from a 3-bit socket field in the 19-bit index; and sending the GTP message from the non-standard port.

7. The method of claim 6, wherein assigning the SN to a GTP message for peer communication includes inserting a 16-bit SN to a GTP version 2 ("GTPv2") between a gateway GPRS support node ("GGSN") and SGSN.

8. The method of claim 6, wherein assigning the SN to a GTP message for peer to peer communication includes inserting a 16-bit SN to a GTP version 1 ("GTPv1") between a gateway GPRS support node ("GGSN") and a serving GPRS support node ("SGSN").

9. The method of claim 6, wherein sending the GTP message from the non-standard port further includes forwarding a locally initiated GTP-C message from GGSN to a serving GPRS support node ("SGSN").

10. A network device, comprising:

a plurality of non-standard ports able to initiate locally created general packet radio service tunneling protocol ("GTP") message for peer communication, wherein the plurality of non-standard ports includes at least eight (8) non-standard ports for a gateway GPRS support node ("GGSN"); and a global index pool coupled to the plurality of non-standard ports, and configured to include a plurality of indexes, wherein each of the plurality of indexes includes a sequence number ("SN") field and a non-standard port field, wherein the SN field contains a SN and the non-standard port field contains a socket number indicating a specific non-standard port, wherein a first SN is configured to be a 16-bit SN for the GTP message which can be sent from the GGSN to a serving GPRS support node ("SGSN"), wherein the global index pool contains at least 500,000 indexes wherein each of the indexes is configured to be a 19-bit wide index, wherein upper portion of the 19-bit index contains a 16-bit SN and lower portion of the 19-bit index contains a 3-bit first socket address.

11. The device of claim 10, wherein the plurality of non-standard ports are non-standard user datagram protocol ("UDP") source ports capable of sending locally generated messages from a gateway GPRS support node ("GGSN") to a serving GPRS support node ("SGSN").

12. The device of claim 10, wherein the global index pool includes 500,000 entries.

13. The device of claim 10, wherein the SN field is a 16-bit field and non-standard port field is a 3-bit field.

* * * * *